(No Model.)

J. PRICE.
VEHICLE.

No. 297,714. Patented Apr. 29, 1884.

Witnesses,
Geo. H. Strong.

Inventor,
Jacob Price
Dewey & Co
Attorneys

UNITED STATES PATENT OFFICE.

JACOB PRICE, OF SAN LEANDRO, CALIFORNIA.

VEHICLE.

SPECIFICATION forming part of Letters Patent No. 297,714, dated April 29, 1884.

Application filed October 6, 1883. (No model.)

*To all whom it may concern:*

Be it known that I, JACOB PRICE, of San Leandro, county of Alameda, and State of California, have invented an Improvement in Vehicles; and I hereby declare the following to be a full, clear, and exact description thereof.

My invention relates to certain improvements in vehicles; and it consists of a frame the side pieces of which are formed of continuous bars of flanged or angle iron, with lugs for the attachment of the seat or other parts, and curved strengthening-ribs at the points where bends are made, all of which will be more fully explained by reference to the accompanying drawings, in which—

Figure 1:
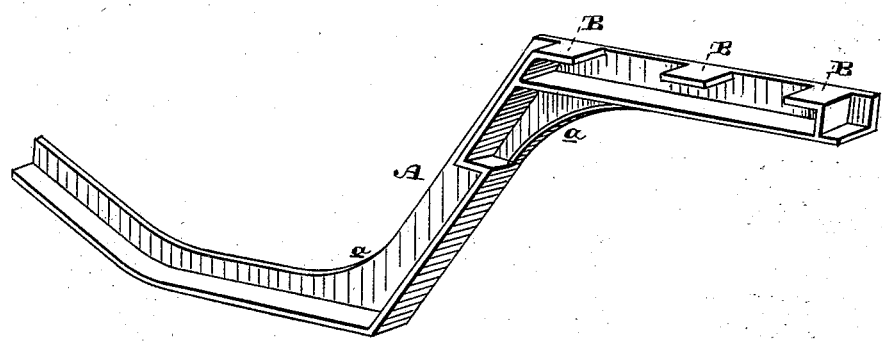
Figure 2:
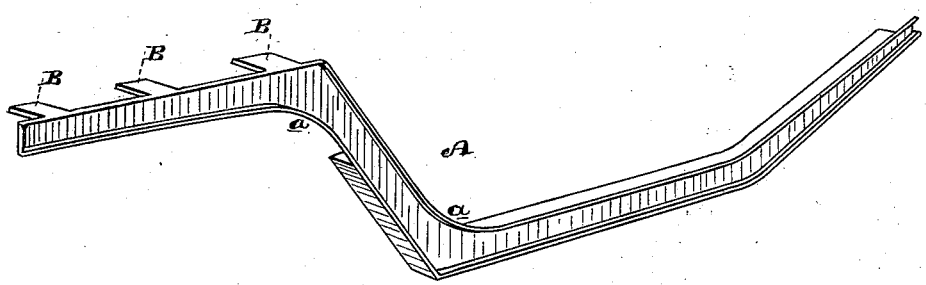

Figure 1 is a view of one of my side bars. Fig. 2 shows reverse side.

My invention is designed especially for phaetons, village-carts, and light riding-carriages, and it consists of two side bars, A, which are preferably made of malleable iron, and of the shape which it is designed to give the carriage. These bars are made with deep flanges at right angles with each other, the outer one standing vertically and the inner ones extending horizontally toward each other, as shown. The bottom or floor boards are secured to the horizontal flanges, and lugs B are formed to project inward from the upright flanges above the horizontal ones, to form convenient support and means for attachment for the seat. The vertical ribs are curved at *a a*, where the bends or angles forming the shape of the body are made, so as to form a deep vertical web at these points, to strengthen them.

Having thus described my invention, what I claim as new, and desire to secure by Letters Patent, is—

1. In a vehicle, the side bars shaped to the form of the body, with vertical and horizontal ribs, and supplemental lugs or seat-supporting flanges, substantially as herein described.

2. In a vehicle, the side bars shaped to the form of the body, with vertical and horizontal ribs, and the deep vertical webs *a a* at the bends or angles, and the supplemental lugs, substantially as herein described.

In witness whereof I have hereunto set my hand.

JACOB PRICE.

Witnesses:
C. D. COLE,
J. H. BLOOD.